United States Patent
Guim Bernat et al.

(10) Patent No.: US 12,231,487 B2
(45) Date of Patent: Feb. 18, 2025

(54) HARDWARE-ASSISTED TRACING SCHEMES FOR DISTRIBUTED AND SCALE-OUT APPLICATIONS

(71) Applicant: Intel Corporation, Santa Clara, CA (US)

(72) Inventors: Francesc Guim Bernat, Barcelona (ES); Patrick Kutch, Tigard, OR (US); Trevor Cooper, Portland, OR (US); Timothy Verrall, Pleasant Hill, CA (US); Karthik Kumar, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 1183 days.

(21) Appl. No.: 16/790,342

(22) Filed: Feb. 13, 2020

(65) Prior Publication Data

US 2020/0186592 A1  Jun. 11, 2020

(51) Int. Cl.
*H04L 67/10* (2022.01)
*H04L 41/14* (2022.01)

(52) U.S. Cl.
CPC .............. *H04L 67/10* (2013.01); *H04L 41/14* (2013.01)

(58) Field of Classification Search
CPC ....... H04L 67/10; H04L 41/14; H04L 43/106; H04L 67/566
See application file for complete search history.

(56) References Cited

U.S. PATENT DOCUMENTS

2003/0167270 A1* 9/2003 Werme ............... G06F 9/505
2014/0282425 A1    9/2014 Zhao et al.
(Continued)

FOREIGN PATENT DOCUMENTS

| JP | 2011048539 A | 3/2011 |
|---|---|---|
| KR | 20160085550 A | 7/2016 |
| KR | 20170112774 A | 10/2017 |

OTHER PUBLICATIONS

International Search Report and Written Opinion for PCT Patent Application No. PCT/US20/60897, Mailed Mar. 5, 2021, 10 pages.
(Continued)

*Primary Examiner* — Abdulkader M Alriyashi
(74) *Attorney, Agent, or Firm* — Compass IP Law PC

(57) ABSTRACT

Methods and apparatus for scale out hardware-assisted tracing schemes for distributed and scale-out applications. In connection with execution of one or more applications using a distributed processing environment including multiple compute nodes, telemetry and tracing data are obtained using hardware-based logic on the compute nodes. Processes associated with applications are identified, as well as the compute nodes on which instances of the processes are executed. Process instances are associated with process application space identifiers (PASIDs), while processes used for an application are associating with a global group identifier (GGID) that serves as an application ID. The PASIDs and GGIDs are used to store telemetry and/or tracing data on the compute nodes and/or forward such data to a tracing server in a manner that enables telemetry and/or tracing data to be aggregated on an application basis. Telemetry and/or tracing data may be obtained from processors on the compute nodes, and (optionally) additional elements such as network interface controllers (NICs). Tracing data may also be obtained from switches used for forwarding data between processes.

10 Claims, 8 Drawing Sheets

(56) References Cited

U.S. PATENT DOCUMENTS

| | | | |
|---|---|---|---|
| 2016/0099853 A1* | 4/2016 | Nedeltchev | H04L 69/22 |
| | | | 370/253 |
| 2016/0359704 A1* | 12/2016 | Gandham | H04L 69/16 |
| 2017/0364561 A1* | 12/2017 | Wu | G06F 16/2456 |
| 2018/0046686 A1* | 2/2018 | Kobayashi | G06F 3/0605 |
| 2019/0228166 A1 | 7/2019 | Smith et al. | |
| 2019/0391798 A1 | 12/2019 | Farrell et al. | |
| 2020/0186592 A1 | 6/2020 | Bernat et al. | |

OTHER PUBLICATIONS

Extended European Search Report for Patent Application No. 20918341.7, Mailed Feb. 8, 2024, 10 pages.

* cited by examiner

HARDWARE-ASSISTED TRACING SCHEMES FOR DISTRIBUTED AND SCALE-OUT APPLICATIONS

Historically, most computer applications were run on mainframes, single compute nodes such as a single computer, server, or (less frequently) small clusters of computers. Conversely, in recent years applications have increasingly becoming distributed, with scale-out (i.e., using multiple servers to execute a single application) emerging as a means to achieve greater compute performance. These scale-out applications include key value stores, graph databases, object stores, machine learning clusters, etc. This growing trend introduces gaps in performance analysis and debug capabilities when compared to existing compute node execution.

For example, consider an application executing on a single node, such as a server. A primary means to analyze and debug performance for such an application would be to use function-based profiling of the application and examine the "hotspots" or "hot spots," which correspond to region(s) of a computer program where a high proportion of executed instructions occur or where more time (relatively) is spent during the program's execution. For example, function-based profiling tools such as the Intel® VTune Profiler may be used to locate application "hotspots" and observer various related metrics, such as shown in the screenshot in FIG. 1. As an illustration, it could be the case that there is a lock-related function that is consuming 35% of CPU time without doing any useful work, and this can easily be identified from the function profile.

Performing this type of analysis becomes significantly more complicated for distributed applications, especially when using a mixture of heterogeneous machines (e.g., servers with different capabilities) interconnected via computer networks with different latencies and capacities and performing different (program) tasks. Worse yet, in today's distributed processing environments a given server may be used for performing concurrent tasks associated with multiple unrelated programs. For example, in multitenant deployments a given physical server's processing resources may be virtualized and leased to multiple separate users, each using their share of the processing resources to execute their own programs.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
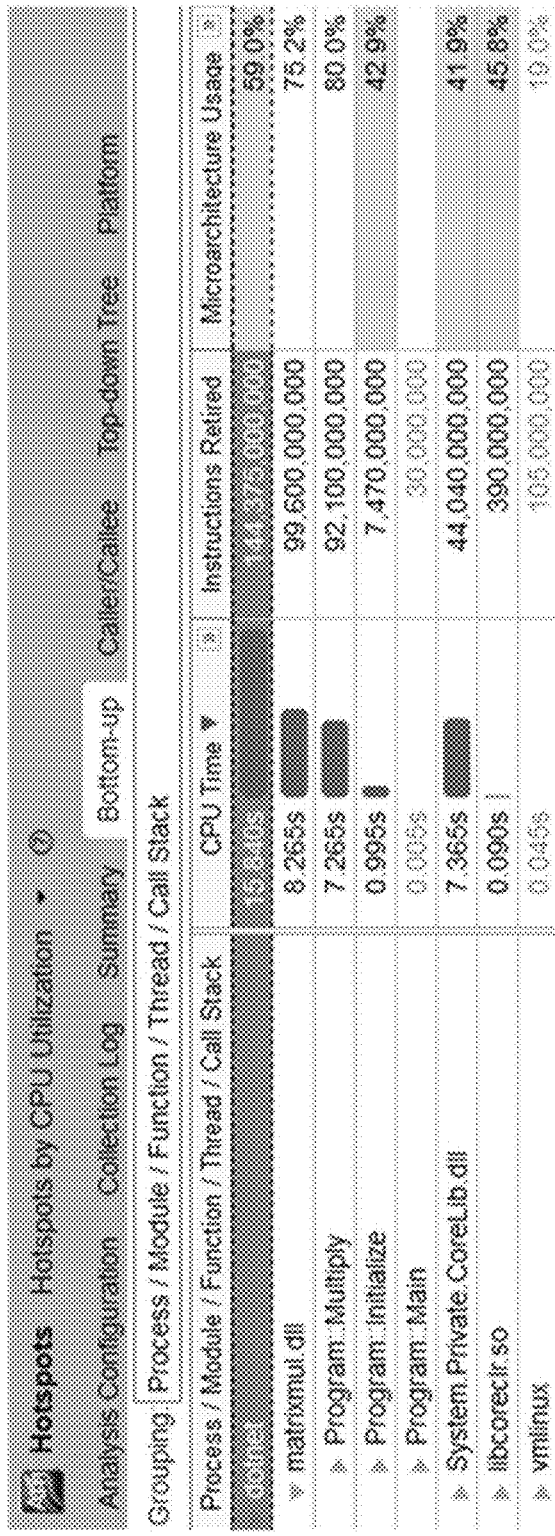
FIG. 1 is a screenshot of an output from an Intel® VTune Profiler application running on a single compute node.

Embodiments of methods and apparatus for scale out hardware-assisted tracing schemes for distributed and scale-out applications are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

How does one employ a similar methodology used for single nodes in scale out architectures, say among N nodes? When the work is distributed amongst N nodes, there should be a holistic means to look at how the application is executing across the N nodes as a whole, and where the application is collectively spending its time in execution. In order to get this, several challenges are encountered, such as:

(1) Information needs to be aggregated across N nodes, say 64 nodes. Several other applications may also be concurrently executing on these N nodes, especially in virtualized/cloud infrastructures, and those other applications should be filtered out to obtain more accurate profiling metrics. This requires some notion of a global application/function ID, that would play a similar role to process or thread ID in a single node.

(2) The data from the 64 nodes needs to be aligned based on some common timestamps, and account for differences in system time between the various nodes.

(3) Differences in compute capability (e.g., processor type and frequency, number of available cores, available memory, etc.) between the nodes should be factored in to be able to present information in a manner that is useful for analysis and debug. For example, saying 30% of the entire application time was spent in function X across the 64 nodes would require factoring in differences if any between the nodes, such as if half the nodes were 28 core parts and the other half were 22 core parts. Alternately, presenting function profiles in terms of time would require accounting for the clock speeds on the nodes. Therefore, there should be some means for recording compute capabilities of the individual nodes.

(4) One function on node A may call another function on node B. For cause-effect analysis, it is often necessary to look at call stacks, such as shown in FIG. 1. For such cases, one may need to factor in alias names of functions across multiple nodes.

Figure 2:
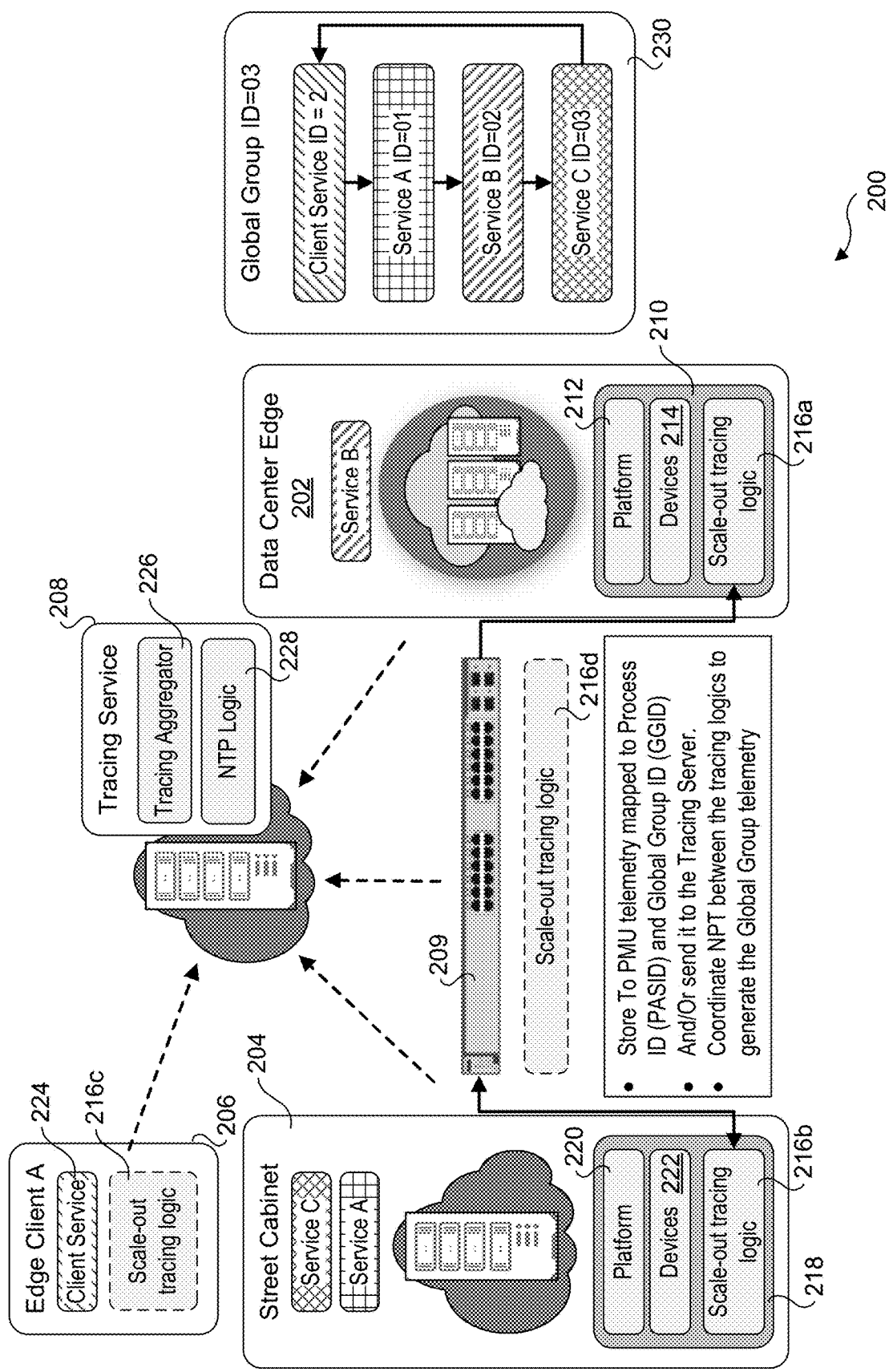
FIG. 2 is a schematic diagram illustrating a first exemplary distributed processing environment in which aspects of the embodiments described herein may be implemented.

A high-level view of an architecture 200 in which aspects of the telemetry scheme are implemented for end-to-end hardware tracing support for edge architectures is shown in FIG. 2. The top-level components in architecture 200 include a data center edge 202, a street cabinet 204, an edge client 206, a tracing service 208, and a switch 209. Data center edge includes multiple servers, such as blade servers, server modules, 1U, 2U servers, etc., and associated devices (e.g., network interfaces and network interface controllers (NICs), storage devices, accelerators, storage class memory (SMC) etc.) installed in one or more cabinets and/or racks. The platforms and devices (and/or their associated resources) may be composed into compute nodes 210 configured to support scale-out tracing, as depicted by a platform 212, devices 214 and scale-out tracing logic 216a.

Street cabinet 204 represents an enclosure (such as a steel box), outbuilding or similar structure housing computing equipment that is located remotely from a data center (e.g., external from data center edge 202). Non-limiting examples of steel cabinet 204 uses include telecommunications equipment (such as located in a structure at the base of a cellular tower), city infrastructure equipment, public or private utility company equipment, and computing equipment that may be used for distributed processing used by companies or individuals. Street cabinet 204 includes computing resources comprising one or more compute nodes 218 configured to support scale-out tracing, as depicted by platform 220, devices 222 multiple servers, each comprising a platform 216 and includes devices 218 and scale-out tracing logic 216b.

Client 206, also labeled and referred to as edge client 'A', represents a client machine (e.g., desktop, laptop, notebook, workstation) that accesses one or more services provided by data center edge 202 using a client service application 224 and applicable protocols over a network (see FIG. 3 below), such as HTTP/HTTPS, REST, JSON, etc. Under a common use case, client services provided by data center edge 202 are implemented as distributed services hosted on multiple compute nodes or platforms, which may include one or more compute nodes 210 in data center edge 202 plus (optionally) one or more compute nodes 218 in street cabinet 204. In some instances, a client machine itself (e.g., edge client 206) may be involved in performing a distributed service, process, etc. Accordingly, edge client 206 also includes scale-out tracing logic 216c.

In accordance with an aspect of some implementations, telemetry data relating to traffic (data transfers) between applications running on compute nodes in one or more street cabinets and a data center (e.g., between applications running on compute node 220 in street cabinet 204 and data center edge 202) may be traced. Accordingly, in some implementations an intermediate network device (i.e., a device along a network datapath) such as switch 209 is configured with scale-out tracing logic 216d.

Generally, an implementation will include tracing service 208 with some form of aggregator 226 and Network Timing Protocol (NTP) logic 228. In some implementations tracing service 208 may be hosted on a server of platform host that is external to a data center (such as illustrated in FIG. 2), while in other implementations tracing service is hosted by compute resources in a data center.

Current telemetry measures within a platform are usually attached to a PASID (process application space ID), which may be associated with one or process instances. To expand the PASID concept to scale-out telemetries, a global group ID (GGID) is used to map a set of applications or processes together. Architecture 200 proposes to use the GGID plus PASID when generating telemetry and tracing within each of the different elements in a data center (platform, devices, switches etc.). During the lifetime of a set of processes logically belonging to the same workload, in one embodiment the new telemetry logic will:

1) Collect the telemetry associated with those processes (PASID) and store the telemetry data in a local platform management unit (PMU) using PASID+GGID plus a GGID timestamp. Similarly, if a tracing server is utilized, the telemetry data, plus PASID+GGID and the timestamp can be sent to the tracing server.

2) Coordinate for that particular Global Group the time using NTP. Note, that each GG may have different accuracy requirements. Hence, different levels of NTP accuracy may be used.

An exemplary use of a GGID and PASIDs are shown in FIG. 2, which depicts a group of services 230 that are assigned a GGID=03. The group of services includes a Service 'A' with a PASID=01 that is running on one or more compute nodes 218 in street cabinet 204, a Service 'B' with a PASID=02 running on one or more compute nodes 210 in data center edge 202, and a Service 'C' with a PASID=03 running on one or more compute nodes 218 in street cabinet 204. The group of service further includes client service 224, which has a PASID=2.

Figure 3:
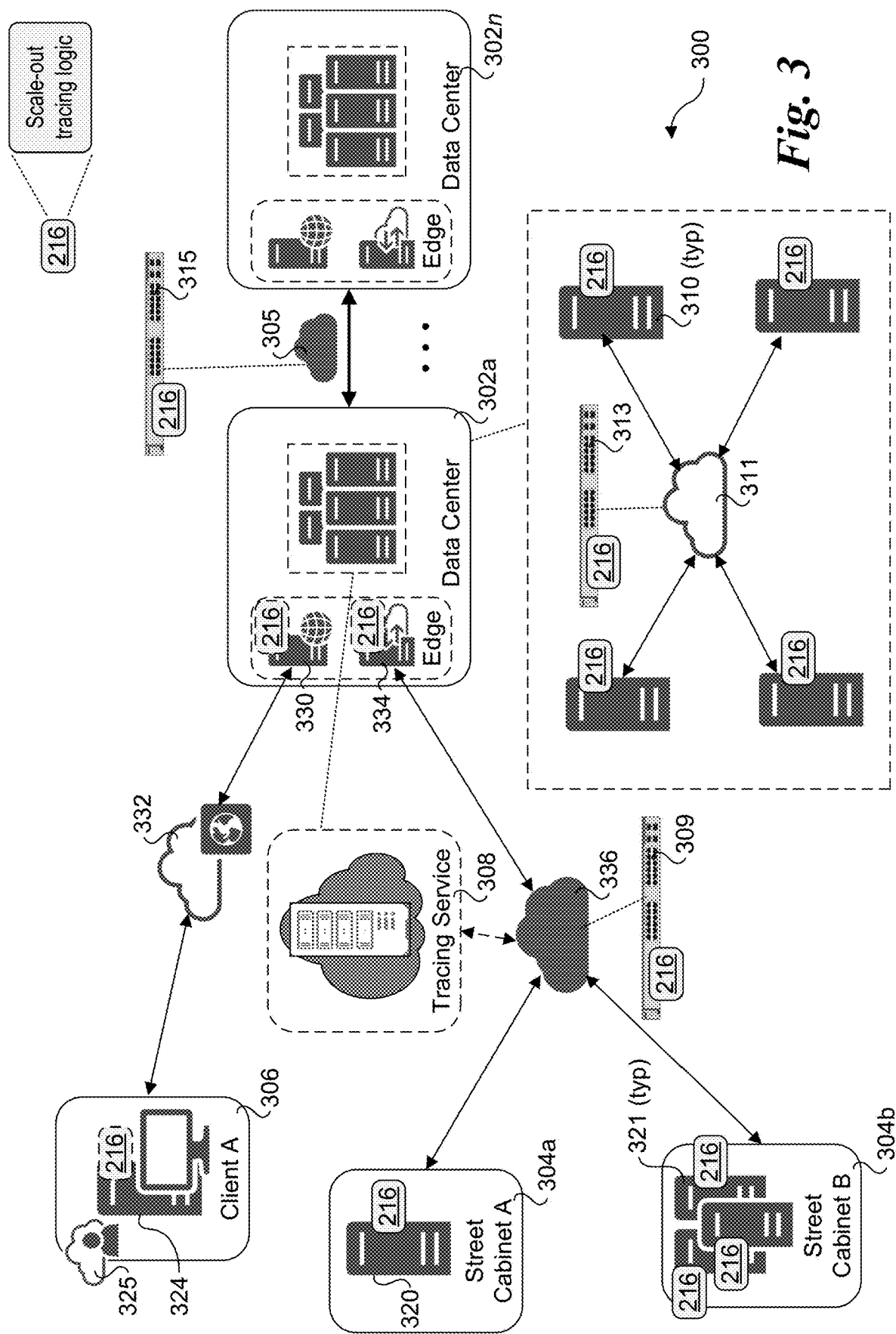
FIG. 3 is a schematic diagram illustrating a second exemplary distributed processing environment in which aspects of the embodiments described herein may be implemented.

FIG. 3 shows a distributed compute node topology 300 illustrating additional aspects to those shown in architecture 200 of FIG. 2. Compute node topology includes one or more data centers 302a . . . 302n, interconnected by a private network 305. Each data center 302a . . . 302n includes a plurality of compute nodes 310 hosted on individual platforms and/or virtualized compute nodes composed of virtualized compute, memory, and storage resources. For example, a data center may employ conventional rack architectures comprising servers or the like with integrated resources (e.g., a blade server with CPU, memory, storage, NIC, etc.), or employ disaggregated architectures such as Intel® Rack Scale Design under which compute, storage, accelerator, and other resources are pooled and reside in separate "drawers" or chassis that are interconnected via a high-speed fabric. As further illustrated, an instance of scale-out tracing logic 216 is implemented on each compute node 310, wherein the illustrated compute node represent compute nodes in a data center that are used for particular distributed processing tasks for which the telemetry scheme disclosed herein may be implemented. Compute nodes 310 are interconnected via a network 311 including one or more switches 313. In some embodiments, one or more switches within a data center, such as switch 313, are configured with an instance of scale-out tracing logic 216.

Some distributed compute node topologies may be implemented entirely in data centers, while other distributed compute node topologies may employ compute nodes that are not implemented in data centers, such as compute nodes in street cabinets and/or compute nodes operated by individual persons and public and private institutions (e.g., universities) and companies. For example, distributed compute node topology 300 includes street cabinets 304*a* (also referred to as Street Cabinet 'A') and a street cabinet 304*b* (also referred to as Street Cabinet 'B'). Street cabinet 304*a* includes a single compute node comprising a standalone server 320 or similar compute platform, while street cabinet 304*b* includes a cluster of servers 321. An instance of scale-out tracing logic 216 is implemented on each of server 320 and servers 321.

Distributed compute node topology 300 also includes one or more clients 306 running (a) client application(s) on various types of platforms, such as a workstation 324 (depicted), laptop, notebook, server, mobile device, etc. In some instances, client 316 will be operated by a user 325. For example, a user may use a client application to monitor telemetry data aggregated by a tracing service 308 or aggregated through other means. Clients may also be used as compute resources for performing distributed tasks. In this case, a client may be operated programmatically or remotely, or may be operated by a user.

Distributed compute node topology 300 further depicts some exemplary network infrastructure and paths that are used to interconnect the various compute nodes. In the illustrated embodiment, client 306 is connected to a Web server 330 at the edge of data center 302*a* via the Internet 332. In some embodiments, communication between client 306 and Web server 330 uses HTTPS and/or a Virtual Private Network (VPN) connection. In some embodiments, an instance of scale-out tracing logic 216 is implemented on Web server 330.

Street cabinets 304*a* and 304*b* are connected to a hybrid server 334 at the edge of data center 302*a* via a private network 336. For example, a mobile service operator may lease network communication infrastructure (or deploy their own infrastructure) to connect its cellular towers to one or more datacenters. Private network 336 includes a switch 309 that is configured with an instance of scale-out tracing logic 216. As further shown, tracing service 308 may be hosted on one or more compute platforms coupled to private network 336 or may be hosted using compute resources in data center 302*a*. In some embodiments, an instance of scale-out tracing logic 216 is implemented on hybrid server 334.

In some instances, distributed processing will be performed by compute nodes in two or more data centers that are interconnected via applicable data center edge components configured to communicate via one or more networks, such as private network 305 in FIG. 3. In some implementations, one or more switches 315 in private network 305 are configured with an instance of scale-out tracing logic 216.

It is noted that the use of instances of scale-out tracing logic 216 in FIG. 3 is not to imply that each instance of scale-out tracing logic implemented by the various components and apparatus (e.g., servers, switches, compute nodes, etc.) is the same, but is rather used for convenience and simplicity. In practice, the configuration and operation of a given instance of scale-out tracing logic 216 will depend on its particular use and implementation context.

Figure 4:
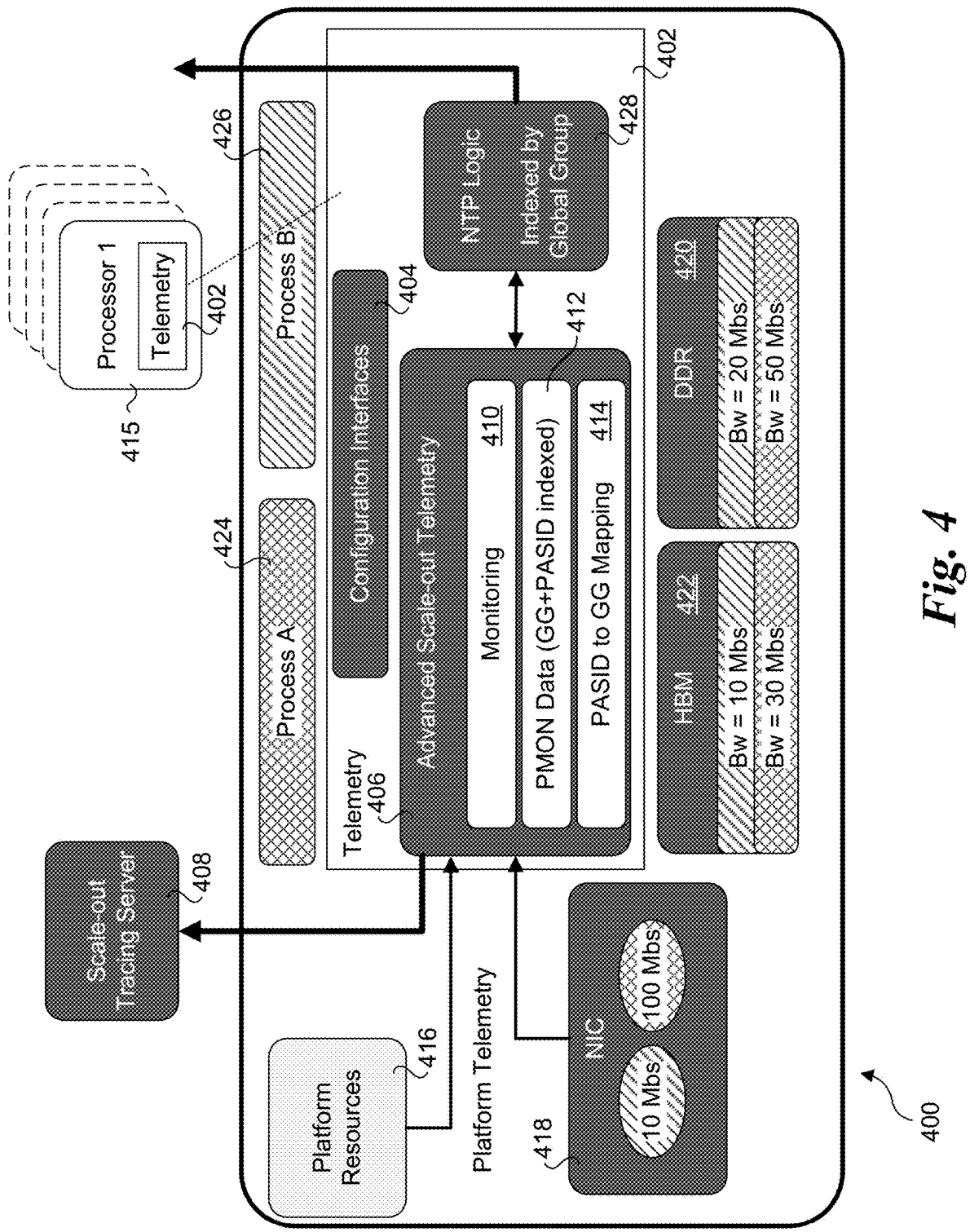
FIG. 4 shows an architecture illustrating further details of components used to implement the functionality associated with scale-out tracing logic and associated components shown in FIGS. 2 and 3.

FIG. 4 shows an architecture 400 illustrating further details of components used to implement the functionality associated with scale-out tracing logic and associated components. Architecture 400 includes a hardware-based telemetry block 402 comprising configuration interfaces 404, advanced scale-out telemetry logic 406 and NTP logic 428. Advanced scale-out telemetry 406 includes monitoring logic 410, performance monitoring (PMON) data logic 412, and PASID to GGID mapping logic 414. Advanced scale-out telemetry 406 may also be configured to provide collected and processed telemetry data to scale-out tracing server 408 for embodiments employing a scale-out tracing server.

Figure 4A:
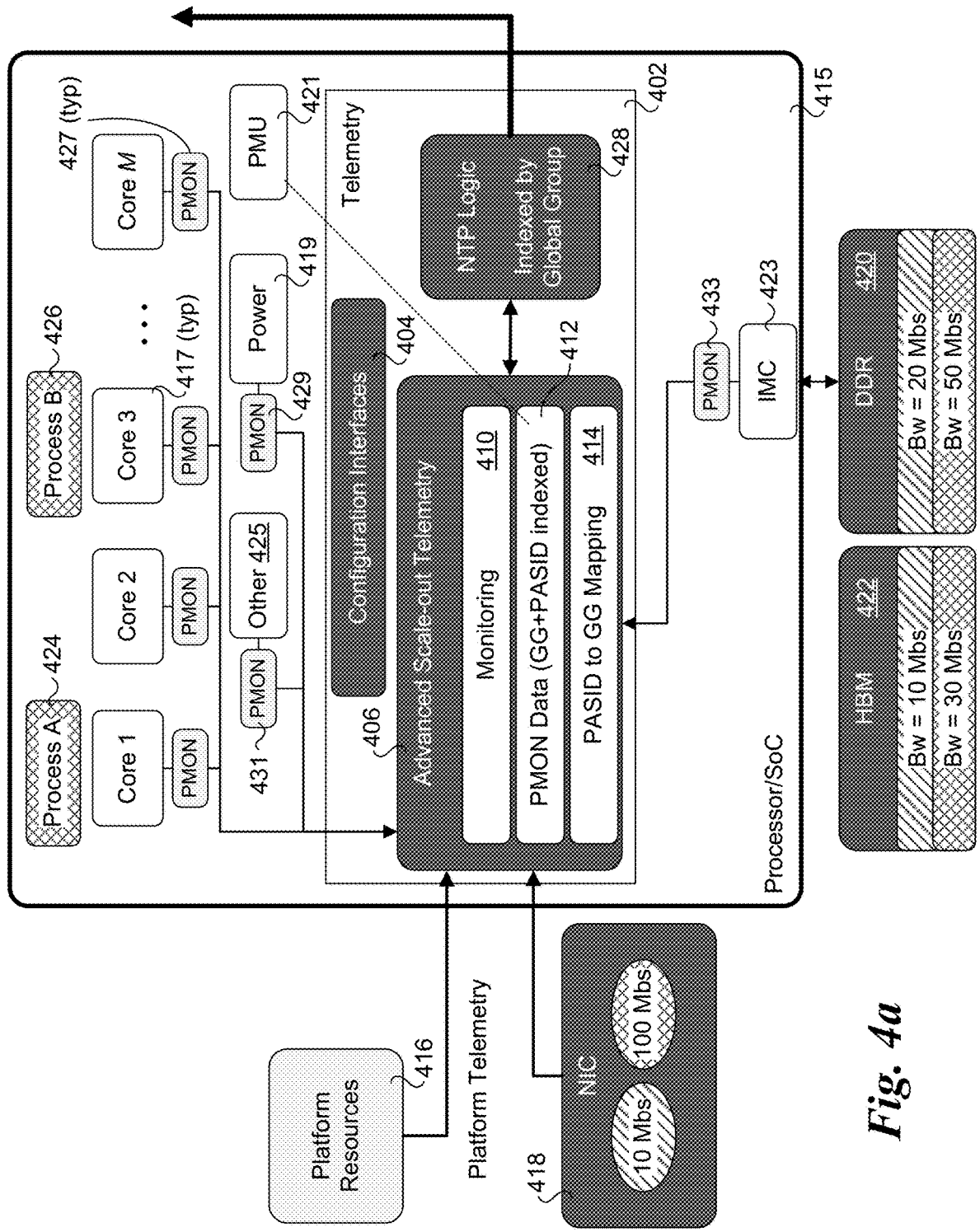
FIG. 4a is a schematic diagram illustrating further details of the processor of FIG. 4, according to one embodiment.

In the illustrated embodiment of FIG. 4, telemetry block 402 is implemented on each of one or more processors 415 installed in a platform, further details of which are shown in FIG. 4*a*. In one embodiment the processor has a System on Chip architecture, as depicted by processor/SoC 415, which includes M processor cores 417, such as 4, 6, 8, 12 or more cores. In addition to telemetry block 402, processor/SoC 415 also includes a power block 419, a performance monitoring unit (PMU) 421, an integrated memory controller 423, and other blocks for which performance monitoring (PMON) data may be provided, as collectively depicted by an "other" block 425.

Modern processors include various PMON blocks that collect performance monitoring data such as telemetry data and/or tracing data from associated components on the processor. In FIG. 4*a* these include a PMON block 427 for each processor core 417, and PMON blocks 429, 431, and 433. A processor/SoC will generally include further components, such as various interconnects, input-output (TO) interfaces, an IO Memory Management Unit (IOMMU), etc., that are not shown for simplicity.

During operation, advanced scale-out telemetry 406 receives PMON data 412 and other data from PMON blocks 427, 429, 431, 433, platform resources 416, and a NIC 418. The platform resources may include double data-rate (DDR) random access memory (RAM) (depicted as DDR memory 420) and HBM 422. DDR memory includes but is not limited to DDR4 and DDR5 memory. In addition, other types of memory may be used, including various types of volatile (e.g., Dynamic RAM (DRAM and Synchronous Dynamic RAM (SDRAM), and non-volatile memory. Memory device form factors include but are not limited to Dual Inline Memory Modules (DIMMs) and Non-Volatile DIMMs (NVDIMMs).

Non-volatile memory is a storage medium that does not require power to maintain the state of data stored by the medium. Non-limiting examples of nonvolatile memory may include any or a combination of: solid state memory (such as planar or 3D NAND flash memory or NOR flash memory), 3D crosspoint memory, storage devices that use chalcogenide phase change material (e.g., chalcogenide glass), byte addressable nonvolatile memory devices, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), other various types of non-volatile random access memories (RAMs), and magnetic storage memory. In some embodiments, 3D crosspoint memory may comprise a transistor-less stackable cross point architecture in which memory cells sit at the intersection of words lines and bit lines and are individually addressable and in which bit storage is based on a change in bulk resistance. In particular embodiments, a memory module with non-volatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at www.jedec.org).

Also depicted are processes 424 and 426 (also labeled and referred to as process A and process B, respectively) which are executing on one or more processor cores 417 (e.g., on Core 1 and Core 3 in FIG. 4*a*. The bandwidth utilization of process A and process B are depicted for each of NIC 418, DDR 420, and HBM 422, where the crosshatch patterns are used to convey what bandwidth is associated with which process. For example, process A consumes/employs 100 Megabits per second (Mbs) of bandwidth for MC 418, 50 MBs of bandwidth for DDR memory 420, and 30 MBs of bandwidth for HBM 422. Meanwhile, process B consumes/employs 10 Mbs of bandwidth for NIC 418, 20 MBs of bandwidth for DDR memory 420, and 10 MBs of bandwidth for HBM 422. The illustrated process bandwidths are merely exemplary, and it is envisioned that upwards of hundreds of processes may be implemented concurrently on a given platform.

A set of interfaces including configuration interfaces 404 supports confirmation of and access to the scale-out telemetry scheme and associated data. One interface supports mapping of one or more processes identified by one or multiple PASIDS to a global group of telemetry. In one embodiment, the following parameters are provided:
i. The list of PASIDS;
ii. The corresponding Global Group ID;
iii. The NTP accuracy needed for this particular GGID; and
iv. Whether the data needs to be stored in the local PMU or is to be sent to a server. In this case an IP (Intellectual Property) block for the server is provided.

Another interface (exposed in an out-of-band fashion with optional authentication in one embodiment) is used to access telemetry for a particular Global Group ID. In one embodiment this interface includes:
i. The Global Group ID from whom data needs to be returned; and
ii. The list of PASIDS to whom the data needs to be returned.

In one embodiment, advanced scale-out telemetry logic 406 is responsible for managing and collecting the telemetry data for a particular GGID. Monitoring logic 410 is responsible for storing telemetry data coming from the different elements of the platform (such as processor cores) and mapping/associating the telemetry data by its PASID and GGID. In one embodiment, existing interfaces (e.g. collected) may be used to define what performance counters or telemetry is to be collected for a PASID. Monitoring logic 410 uses NTP logic 428 to get the current time stamp for the GG before storing the data. Depending on the configuration for a given GGID, monitoring logic 410 will forward the telemetry data to PMON Data logic 412 or send the telemetry data to scale-out tracing server 408.

In one embodiment, PMON data logic 412 is responsible for storing the data collected by monitoring logic 410. As shown, PMON data logic 412 indexes this data by GGID and PASID. PASID to GG mapping logic 414 is the logic used to map PASIDs to GGIDs. For example, multiple PASIDs may be mapped to a given GGID. This is configured by the first of interface discussed above.

NTP logic 428 is responsible for coordinating timing events between the distributed processing elements (e.g., data center compute nodes) where a particular GG has processes running. In one embodiment, NTP logic 428 includes a mapping of a list of elements where the GG has a PASID or may be used by processes belonging to the GG (e.g., Service A uses switch X to communicate with Service B). NTP logic 428 further may include a mapping of accuracy for each of the different GGs that are registered in the platform. Depending on this accuracy, NTP logic 428 may also be responsible for keeping synchronization of the time between different processing elements. For example, in one embodiment NTP logic 428 employs the Network Time Protocol (hence the name NTP logic). Other network time or clock synchronization schemes, both existing and future schemes, may also be used.

Scale-out tracing server 408 is configured to interface with advanced scale-out telemetry logic 406 running on various distributed processing elements and switches and store the various telemetry data that it receives from the distributed processing elements and switches. In one embodiment, scale-out tracing server 408 includes:
i. Input interfaces to be used by the different platforms to push telemetry for a particular PASID and GGID;
ii. Output interfaces to provide access to telemetry or tracing data for selected PASIDs and GGIDs for telemetry data consumers/viewers (e.g., edge client 206 or client 306); and
iii. Logic or storage that is responsible for storing telemetry and tracing data based on its associated GGID and PASID.

In one embodiment, authentication and security schemes are implemented to set up secure communication links or channels between telemetry data providers (e.g., advanced scale-out telemetry logic 406 running on a compute node) and the input interfaces of scale-out tracing server 408, and between clients and output interfaces of the scale-out tracing server.

Figure 5:
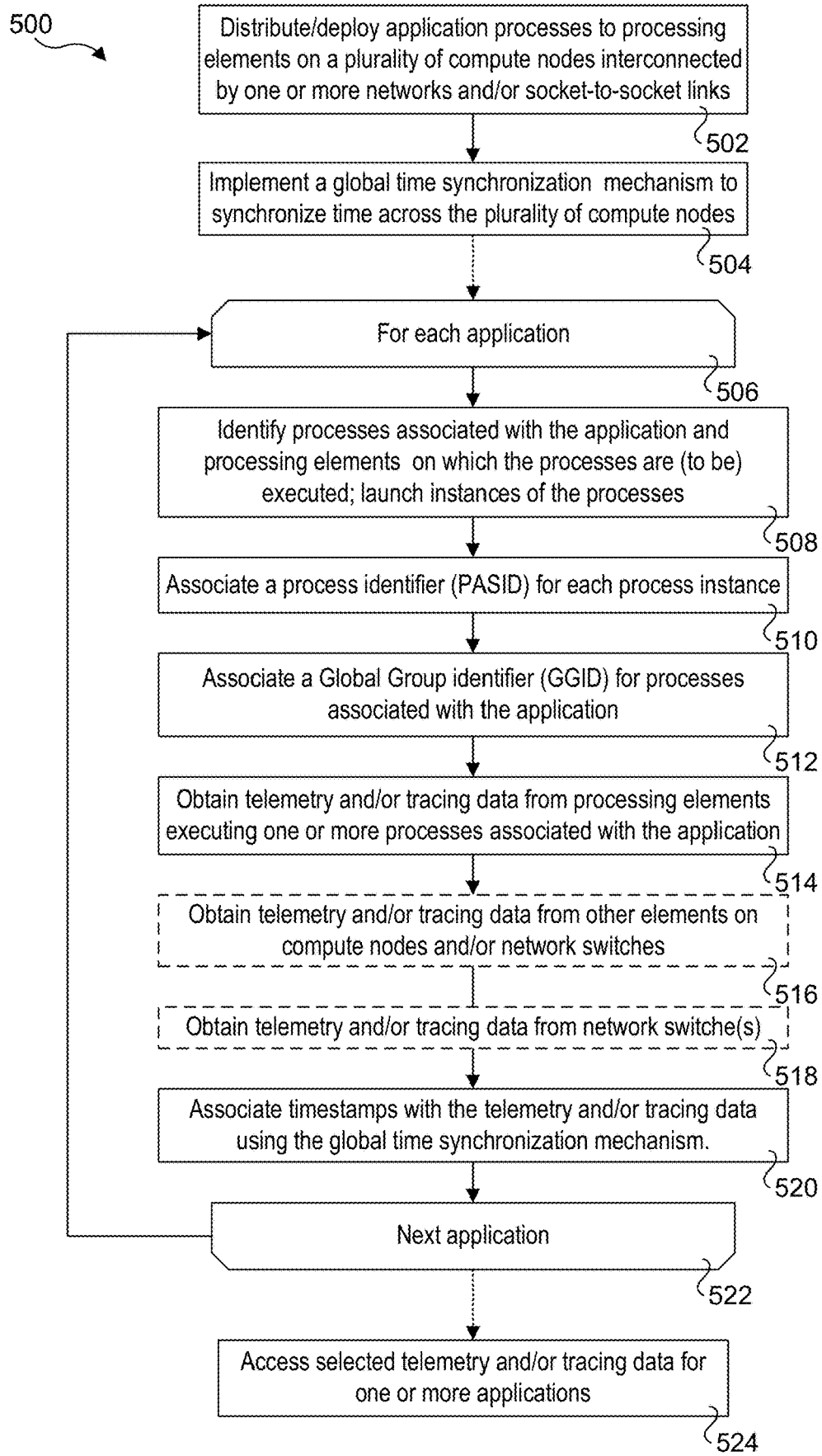
FIG. 5 is a flowchart illustrating operations associated with obtaining telemetry and tracing data for applications implemented using distributed processes, according to one embodiment.

FIG. 5 shows a flowchart 500 illustrating operations associated with obtaining telemetry and tracing data for applications implemented using distributed processes. The operations in blocks 502 and 504 are performed to configure the distributed processing environment and include distributing and/or deploying application processes to processing elements on a plurality of compute nodes interconnected by one or more networks and/or interconnected by socket-to-socket links. Non-limiting examples of distributed processing environments including compute nodes interconnected via one or more networks are shown in FIGS. 2 and 3 and discussed above. Generally, as used herein a compute node is a compute platform, such as a server that includes a processing element on which software processes (aka threads) are executed. Processing elements include processors, such as but not limited to processors manufactured by Intel® Corporation, AMD® Corporation, and various ARM-based processors having ARM® cores and/or architectures. Generally, the software code associated with a process may be loaded into memory from a storage device on the platform or may be loaded over a network from a network storage device or the like. Some compute nodes may be implemented on multi-socketed platforms with two or more processors interconnected via high-speed socket-to-socket interconnect, wherein each processor operates as a compute node.

In block 504, a global time synchronization mechanism is implemented. In one embodiment, the Network Time Protocol is implemented, as discussed above. NTP is a well-known standardized protocol for clock synchronization between computer systems interconnected via packet-switched networks. The NTP standards are available at www.npt.org. In other embodiments, other time synchronization mechanisms and protocols may be used.

As depicted by start and end loop block 506 and 522, the operations in blocks 508, 510, 512, 514, 520 and optional block 516, 518 are performed for each of one or more applications implemented via execution of distributed processes for which telemetry and/or tracing data is to be obtained. In a block 508, the processes associated with the application are identified, as well as processing elements on the compute nodes that are used to execute instances of the processes. During the distributed processing operations, instances of processes will be launched. As shown in block 510, each instance of a process will be associated with a PASID.

Each application has an associated GGID for which the distributed processes used to implement the application are associated, as shown in block 512. The associated between GGIDs and PASIDs one individual compute node is implemented by PASID to GGID mapping logic 414 in one embodiment.

In block 514 telemetry and/or tracing data is obtained from the processing elements on which the process instances are executed. For example, as discussed above with reference to FIG. 4a, PMON blocks 427 are used to collect various performance and statistical data relating to processes executing on processor cores 417. PMON blocks 427 also provide interfaces to enable data they collect to be retrieved by monitoring logic 410.

In an optional block 516, telemetry and/or tracing data is obtained from one or more other elements on the compute nodes, such as from a NIC, management component(s) on the platform, such as a baseboard management controller, or any other platform element configured to generate telemetry and/or tracing data that is to be included in the telemetry/tracing data for the application.

In another optional block 518, telemetry and/or tracing data is obtained from one or more network switches. As discussed above, network switches may be configured to generated telemetry data that may be forwarded to a tracing server or one of the compute nodes.

In a block 520 timestamps are associated with the telemetry and/or tracing using the global time synchronization mechanism. For example, for compute nodes this may be implemented by NTP logic 428. NTP logic may also be implemented for switches or, optionally, the telemetry/tracing data obtained from a switch may include an NTP timestamp associated with packets used for tracing or providing telemetry data.

As shown in block 524, selected telemetry and/or tracing data for one or more application is accessed. For instance, such data may be accessed by a client accessing a tracing service provided by a tracing server or provided by one or the compute nodes that is implemented for aggregating telemetry and tracing data.

Figure 6:
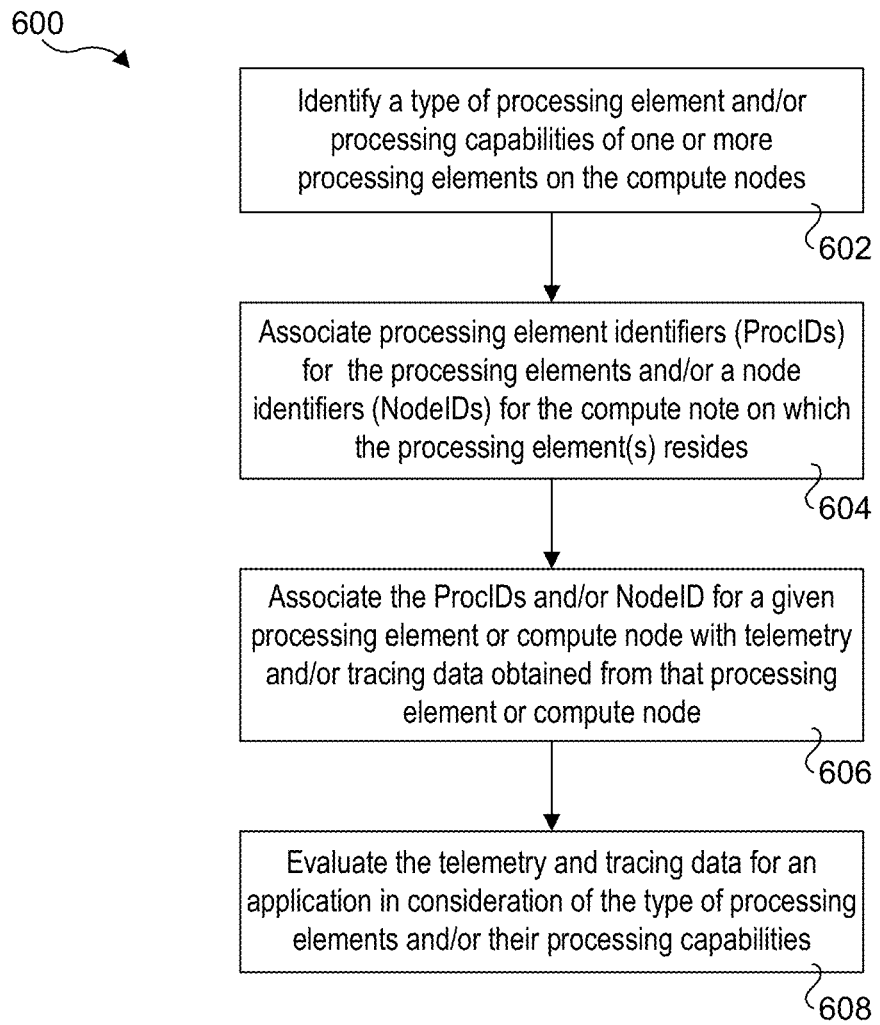
FIG. 6 is a flowchart illustrating operations to associate processing elements and compute nodes with processes executed on the processing elements and compute nodes, according to one embodiment.

FIG. 6 shows a flowchart 600 illustrating operations to associate processing elements and compute nodes with processes executed on the processing elements and compute nodes. In a block 602, processing elements on the compute nodes are identified by type and/or processing capabilities. For example, processors generally have model or product numbers that may be used to identify a processor and its capabilities. In a block 604, processing element (or processor) identifiers (ProcIDs) and associated with the various processing elements used for executing the processes associated with the one or more distributed applications. Optionally or in addition to, compute node identifiers (NodeIDs) are associated with the compute nodes on which the processing elements reside. Under one embodiment, in cases under which a compute node has a single processing element, the NodeID may be substituted for a ProcID.

In a block 606, the ProcID and/or the NodeID for a given processing element or compute node is associated with telemetry and/or tracing data obtained from the processing element or compute node. In a block 608, the telemetry and tracing data for an application is evaluated in consideration of the type of processing element and/or the processing elements' capabilities.

Figure 7:
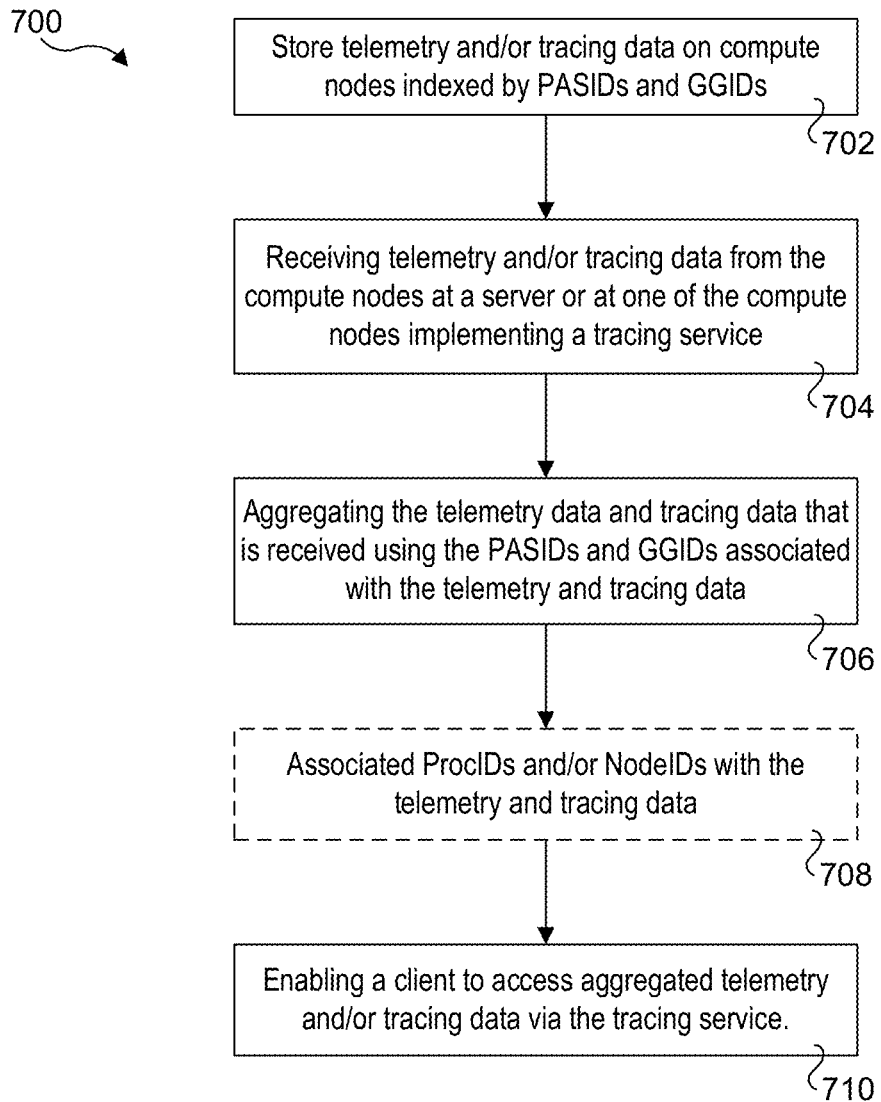
FIG. 7 is a flowchart illustrating operations performed to implement aspects of telemetry and tracing data storage, forwarding, aggregation, and presentation, according to one embodiment.

FIG. 7 shows a flowchart 700 illustrating operations performed to implement aspects of telemetry and tracing data storage, forwarding, aggregation, and presentation, according to one embodiment. In a block 702, telemetry and/or tracing data is stored on the compute nodes indexed by PASIDs and GGIDs, such as described above and illustrated in FIG. 4. In a block 704, telemetry and/or tracing data is received from the compute nodes at a server or at one of the compute nodes on which a tracing service is implemented. For example, the server may be tracing server 208 or 308, or 408 shown in FIGS. 2, 3, and 4. For distributed processing employing (only) compute nodes in one or more datacenters, one of the compute nodes or another compute node or compute platform that is not being used for the distributed processing may be deployed to implemented a tracing service.

Generally, the telemetry and tracing data may be received using either a pull or push service or mechanism. For example, in one embodiment, telemetry and/or tracing data is periodically pulled from the compute nodes using a schedule or the like (although asynchronous pull modes may also be employed). In another embodiment, an agent or the like on the compute nodes may periodically or asynchronously push telemetry and/or tracing data to a platform hosting a tracing service.

In a block 706 the received telemetry and tracing data is aggregated using the PASIDs and GGIDs associated with those data. In an optional block 708, ProcIDs and/or NodeIDs are associated with telemetry and tracing data, observing that the operations of blocks 706 and 708 may be combined. For example, in some embodiments, telemetry and/or tracing data associated with a processing element is received in a manner that associates each the ProcID for that processing element in combination with the PASID for each process and a GGID for each application for which telemetry and/or tracing data is obtained.

In a block 710, a client is enabled to access aggregated telemetry and/or tracing data via the tracing service. For instance, in one embodiment tracing service is implemented as a Web service that interfaces with a client application or service running on the client using a REST API or other Web service API using JSON and/or XML, data structures. As an alternative, the client functionality may be implemented on the same server or platform as the tracing service.

Under an alternatively scheme, proxy agents or the like may be used to collect telemetry and/or tracing data from compute nodes associated with the proxy agents and then forward or expose the telemetry and or tracing data. For instance, a separate proxy agent might be implemented at the data center level, at a pod level, at a rack level, or at a chassis or drawer level. Proxy agents may also be configured to perform certain levels of aggregation.

In general, the circuitry, logic and components depicted in the figures herein may also be implemented in various types of integrated circuits (e.g., semiconductor chips) and modules, including discrete chips, SoCs, multi-chip modules, and networking/link interface chips including support for multiple network interfaces. Also, as used herein, circuitry and logic to effect various operations may be implemented via one or more types of hardware-based logic, such as embedded logic, embedded processors, controllers, microengines, or otherwise using any combination of firmware executing on a processing element on the hardware. For example, the operations depicted by various logic blocks and/or circuitry may be effected using programmed logic gates and the like, including but not limited to ASICs, FPGAs, IP block libraries, or through one or more of software or firmware instructions executed on one or more processing elements including processors, processor cores, controllers, microcontrollers, microengines, etc. As used herein, the terminology "hardware-based logic" explicitly excludes software executing on or requiring use of an operating system or software running on a virtualization layer.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Italicized letters, such as 'n' and 'M' in the foregoing detailed description are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

As discussed above, various aspects of the embodiments herein may be facilitated by corresponding firmware components, such as firmware executed by an embedded processor or the like. Thus, embodiments of this invention may be used as or to support firmware executed upon some form of processor, processing core or embedded logic or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

The operations and functions performed by various components described herein may be implemented by firmware running on a processing element, via embedded hardware or the like, or a combination of hardware and firmware. Such components may be implemented as firmware modules, hardware modules, special-purpose hardware (e.g., application specific hardware, ASICs, DSPs, etc.), embedded controllers, hardwired circuitry, hardware logic, programmable logic, etc. Firmware content (e.g., data, instructions, configuration information, etc.) may be provided via an article of manufacture including non-transitory computer-readable or machine-readable storage medium, which provides content that represents instructions that can be executed. The content may result in a processor and/or compute node performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A compute platform, comprising:
   memory;
   a processor, coupled to the memory, including one or more processor cores and hardware-based logic configured to,
   trace processes executing on the one or more processor cores and associated with one or more groups of distributed services being executed in a distributed processing environment including the compute platform;
   associate process application space identifiers (PASIDs) with the processes;
   associate one or more PASIDs for one or more groups of distributed services associated with processes executing on the one or more processor cores;
   associate group identifiers (IDs) for the one or more groups of distributed services;
   obtain at least one of telemetry data and tracing data from the one or more processor cores relating to execution of the processes on the one or more processor cores; and
   associate the at least one of telemetry data and tracing data for a process with the PASID for the process and the group ID for the group of distributed services associated with the process.

2. The compute platform of claim 1, wherein the hardware-based logic further is configured to enable the compute platform to send at least one of telemetry data and tracing data that are obtained to a tracing service connected to the compute platform via a network, wherein the at least one of telemetry data and tracing that is sent comprises at least one of telemetry data and tracing data for a process that is associated with the PASID for the process and the group ID for the distributed application for which the process is executed.

3. The compute platform of claim 2, wherein the hardware-based logic is further configured to:
   receive or generate a node identifier (NodeID); and
   associate the NodeID with telemetry data and tracing data sent to the tracing service.

4. The compute platform of claim 2, wherein the hardware-based logic is further configured to:
   obtain a processor identifier (ProcID) for the processor; and
   associate the ProcID with at least one of telemetry data and tracing data relating to processes executed on the processor.

5. The compute platform of claim 1, wherein the distributed processing environment employs the Network Time Protocol (NTP), and wherein the hardware-based logic further enables the compute platform to implement a first time clock having a time coordinated for a first group ID using NTP, and assign timestamps to telemetry data and tracing data for processes associated with the first group ID using the first time clock.

6. A processor, configured to be installed in a compute platform implemented as a compute node in a distributed processing environment in which processes associated with one or more groups of distributed services are executed in a distributed manner, the processor comprising:
   one or more processor cores;
   a memory interface; and
   hardware-based logic, configured to:
   trace processes executing on the one or more processor cores;
   associate process application space identifiers (PASIDs) with the processes;
   associate one or more PASIDs for one or more groups of distributed services associated with processes executing on two or more processor cores;
   associate group identifiers (IDs) for the one or more groups of distributed services;
   obtain at least one of telemetry data and tracing data from the two or more processor cores relating to execution of the processes on the two or more processor cores; and
   associate the at least one of telemetry data and tracing data for a process with the PASID for the process and the group ID for the group of distributed services associated with the process.

7. The processor of claim 6, wherein the hardware-based logic is further configured to send at least one of telemetry data and tracing data obtained by the processor to a tracing service connected to the compute platform via a network, wherein the at least one of telemetry data and tracing data that is sent comprises at least one of telemetry data and tracing data for a process that is associated with the PASID for the process and the group ID for the group of distributed services for which the process is executed.

8. The processor of claim 7, wherein the hardware-based logic is further configured to:
   receive or generate a node identifier (NodeID); and
   associated the NodeID with telemetry data and tracing data sent to the tracing service.

9. The processor of claim 7, wherein the hardware-based logic is further configured to:
   obtain a processor identifier (ProcID) and
   associated the ProcID with telemetry data and tracing data sent to the tracing service.

10. The processor of claim 6, wherein the distributed processing environment employs the Network Time Protocol (NTP), and wherein the hardware-based logic is configured to implement a first time clock having a time coordinated for a first group ID using NTP, and assign timestamps to telemetry data and tracing data for processes associated with the first group ID using the first time clock.

* * * * *